United States Patent
Eggert et al.

(10) Patent No.: US 8,433,661 B2
(45) Date of Patent: Apr. 30, 2013

(54) ARTIFICIAL VISION SYSTEM AND METHOD FOR KNOWLEDGE-BASED SELECTIVE VISUAL ANALYSIS

(75) Inventors: Julian Eggert, Obertshausen (DE); Sven Rebhan, Obertshausen (DE)

(73) Assignee: Honda Research Institute Europe GmbH, Offenback/Main (DE)

( * ) Notice: Subject to any disclaimer, the term of this patent is extended or adjusted under 35 U.S.C. 154(b) by 527 days.

(21) Appl. No.: 12/711,292

(22) Filed: Feb. 24, 2010

(65) Prior Publication Data

US 2010/0223216 A1    Sep. 2, 2010

(30) Foreign Application Priority Data

Feb. 27, 2009 (EP) .................................... 09153896
Jan. 27, 2010 (EP) .................................... 10151739

(51) Int. Cl.
*G06F 15/18* (2006.01)

(52) U.S. Cl.
USPC .................................................. 706/12

(58) Field of Classification Search .................. None
See application file for complete search history.

(56) References Cited

U.S. PATENT DOCUMENTS

2007/0179918 A1    8/2007   Heisele et al.
2010/0083109 A1*   4/2010   Tse et al. ...................... 715/702

OTHER PUBLICATIONS

Navalpakkam, Vidhya et al., "Modeling the Influence of Task on Attention", Vision Research, vol. 45, No. 2, 2005, pp. 205-231.
Borji, Ali et al., "Learning Object-Based Attention Control", XP-002579569, Dec. 12, 2008, pp. 1-7.
Borji, Ali, "Interactive Learning of Task-Driven Visual Attention Control", Ph.D. Thesis, School of Cognitive Sciences, XP-002579570, 2009, pp. 1-162.
Draper, Bruce A., "Learning Object Recognition Strategies", Ph.D. Thesis, Department of Computer Sciences, University of Massachusetts, XP-002579571, May 1993, 167 pages.
Rohrbein, Florian et al., "Bayesian Columnar Networks for Grounded Cognitive Systems", 30th Annual Meeting of the Cognitive Science Society, XP-002579572, Jun. 23, 2008, pp. 1423-1429.
European Search Report application No. 10151739.9 dated Jun. 9, 2010.

* cited by examiner

*Primary Examiner* — Kakali Chaki
*Assistant Examiner* — Luis Sitiriche
(74) *Attorney, Agent, or Firm* — Squire Sanders (US) LLP

(57) ABSTRACT

Generally the background of the present invention is the field of artificial vision systems, i.e. systems having a visual sensing means (e.g. a video camera) and a following processing stage implemented using a computing unit. The processing stage outputs a representation of the visually analysed scene, which output can then be fed to control different actors, such as e.g. parts of a vehicle (automobile, plane, . . . ) or a robot, preferably an autonomous robot such as e.g. a humanoid robot.

23 Claims, 13 Drawing Sheets

ARTIFICIAL VISION SYSTEM AND METHOD FOR KNOWLEDGE-BASED SELECTIVE VISUAL ANALYSIS

Generally the background of the present invention is the field of artificial vision systems, i.e. systems having a visual sensing means (e.g. a video camera) and a following processing stage implemented using a computing unit. The processing stage outputs a representation of the visually analysed scene, which output can then be fed to control different actors, such as e.g. parts of a vehicle (automobile, plane, . . . ) or a robot, preferably an autonomous robot such as e.g. a humanoid robot (one example being Honda's ASIMO® robot).

Further, the inventive vision system can also be applied in various other domains, as in systems for ground, water and/or air bound vehicles, including systems designed to assist a human operator. The method and/or system disclosed herein in general may be used whenever a technical (e.g., an electronic) system is required to autonomously learn and obtain characteristics and/or properties of objects (e.g., size, distance, relative/absolute position also to other objects, spatial alignment, relative movement, speed and/or direction and other related object features or feature patterns) which are presented to the system.

Such artificial computer-based vision systems usually rely on several concatenated processing steps, starting with input from one or several camera devices, which is then processed by a cascade of filtering and selection algorithms.

At the end of the cascade, the result is then a low-dimensional representation of those aspects of interest for the application that makes use of the computer vision system.

Inherent to known current computer vision systems is their feed-forward character. The basic events are triggered by the arrival of new images, processed, and the results passed to the next processing stages. A typical sequential processing chain comprises stages for image acquisition, preprocessing, feature extraction, detection/segmentation and high-level processing. Even though the dominant information flow is feed-forward, each of these steps may involve several iterations and also recurrent information flow. Recurrent information flow may appear as well between different stages, but this is seldom the case, since such systems are more difficult to control.

Another property of known computer vision systems is that they operate with poor internal representations, i.e., they concentrate on specific aspects of the visual input which can be represented in a very compact form (e.g. the id of an object identity, or another small set of data) and use very little additional, more global knowledge, e.g. the overall visual scene context or the sensory appearance of objects.

This leads to systems that are highly specialized for a particular domain, but that are inflexible for others, standing in complete contrast to biological vision systems, which are general-purpose and adapt to different visual tasks. In addition, in human scene interpretation, a lot of prior knowledge about scenes, objects, as well as their visual and physical properties is incorporated as constraints or modulation parameters for visual processing. Furthermore, in contrast to most state-of-the-art systems, the information acquisition process in humans is assumed to be active. That is, humans actively scan the visual scene for objects that are relevant for their current visual tasks.

For a vision system to be sufficiently general and adaptable to different visual subtasks during operation, the modulation and organization of visual processing resources from already previously (impartial) knowledge about a scene becomes a central element, since the same elements of the system have to be recruited for different purposes. This requires a special representation and a special control of the information flow in the vision system for making efficient use of the limited resources.

The known computer vision systems, which rely on a static information flow scheme dominated by the visual input, scale very badly with an increase in the number of visual subtasks. A system that flexibly adapts its processing flow and resources depending on the current context and visual task exhibits advantages in this case, both in terms of the complexity of the required architecture (since many modules can be efficiently reused) as well as in the overall computational requirements. Here, the active inspection of the scene plays a major role.

This invention is also related with scheduling mechanisms as known from the wide field of compiler optimization and graph-based computation (see the paper draft for more details).

Additionally, this work exhibits a relation to algorithms based on probabilistic methods that approach optimal planning and sequential decision making for sensory action, as given e.g. by POMDP'S (Partially Observable Markov Decision Processes) in robotics and computational intelligence fields. In particular, it has been proposed in [14, 15] to adapt the visual workflow in an active, dynamic manner. In [14, 15], for a very simple scene configuration the selection process is guided exclusively by the probability of finding a certain feature in the current scene. Knowledge about the richer context, either in terms of long-term knowledge about object configurations or sensory processes or in terms of a broad sensory context is not used.

A method for computer vision that adapts its information processing flow, its processing resources and its parameters using explicit knowledge about the perceivable world, its objects and its properties, the current vision task, the sensory context, and the perception apparatus itself therefore provides numerous benefits for a flexible vision system that has to operate in real time, with constrained resources, and that takes into consideration a vast body of experience (either explicitly incorporated or learned from experience).

Typically, an input signal or input pattern is accepted from a sensor, which is processed by hardware units and software components. An output signal or output pattern is obtained, which may serve as input to other systems for further processing, e.g. for visualization purposes. The input signal may be supplied by one or more sensors, e.g. for visual or acoustic sensing, but also by a software or hardware interface. The output pattern may as well be output through a software and/or hardware interface or may be transferred to another processing unit or actor, which may be used to influence the actions or behavior of a robot or vehicle.

Computations and transformations required by the invention may be performed by a processing means such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

The invention employs a relational semantic memory which uses data storage means. The data storage means is used for storing information and/or data obtained, needed for processing and results as well as data structures. The storage also allows storing or memorizing observations related to events and knowledge deducted therefrom to influence actions and reactions for future events.

The storage may be provided by devices such as a hard disk (SSD, HDD), RAM and/or ROM, which may be supplemented by other (portable) storage media such as floppy disks, CD-ROMs, Tapes, USB drives, Smartcards, Pen-drives etc. Hence, a program encoding a method according to the invention as well as data acquired, processed, learned or needed in/for the application of the inventive system and/or method may be stored in a respective storage medium.

In particular, the method described by the invention may be provided as a software program product on a (e.g., portable) physical storage medium which may be used to transfer the program product to a processing system or a computing device in order to instruct the system or device to perform a method according to this invention. Furthermore, the method may be directly implemented on a computing device or may be provided in combination with the computing device.

PRIOR ART

Known technical computer vision systems are designed to solve a multitude of tasks such as object recognition, identification and detection, object tracking, image restoration, motion estimation and scene reconstruction.

There exist several known methods for solving various well-defined computer vision tasks, where the methods often are very task specific and seldom can be generalized over a wide range of applications. Many of the methods and applications are still in the state of basic research, but more and more methods have found their way into commercial products, where they often constitute a part of a larger system which can solve complex tasks (e.g., in the area of medical images, or quality control and measurements in industrial processes). In most practical computer vision applications, the computers are pre-programmed to solve a particular task, but methods based on learning are now becoming increasingly common.

The classical well-defined computer vision tasks are usually located near to the sensory periphery, i.e., they deal with low-level vision. So-called "high-level" vision then deals with combining the different information, in order to verify that the data satisfies application-specific assumptions or estimate application-specific parameters, such as e.g. an object pose or size.

Nevertheless, current computer vision systems are based on fixed information flow schemes. In the following, we assume that a number of basic visual subtasks, or visual subroutines, is available, e.g. as given by partial processing steps needed for tracking, segmentation, object classification, etc. There is a large amount of previous work dealing with this type of subtasks. On the other hand this work is related with scheduling mechanisms as known from the wide field of compiler optimization and graph-based computation.

On the other hand, AI approaches like [12, 13] exist that compile visual processing programs for a given visual task, starting from a problem formalization. These systems work in a feed-forward manner and use their knowledge about the visual algorithms to guide the process of program construction. Nevertheless, the target of the AI approaches is to construct a fixed vision application, i.e., knowledge about vision processes is incorporated but the final result is again a system with a rigid information flow, where all the considerations about poor scalability apply.

SUMMARY OF THE INVENTION

The objects of the invention are achieved by a method and a system according to the independent claims. Advantageous embodiments are defined in the dependent claims.

The invention provides a method for computer vision that adapts its information processing flow, its computing resources and its computing parameters using explicit knowledge about the perceivable world as sensed by vision sensors, its objects and its properties, the current vision task, the sensory context, and the perception apparatus itself, comprising the steps of representing sensory events such as visually perceivable objects as node entities with measurable sensory parameters that are connected to other nodes by directed links expressing functional relationships, representing the current visual sensory context by connected graphs of sensory events, representing visual subtask information, i.e., information on how to access and measure sensory parameters of a previous step in special subgraphs and local processes attached to these subgraph nodes and links, dynamically allocating computing resources during runtime and organizing information flow by using the information from the so-called "relational memory" from previous steps, optimizing the resource allocation and the information flow depending on the graph structures from previous steps, storing estimated values gained from sensory measurements in the corresponding node and link entities of the graph, in this way updating the information from previous steps, incrementally adapting and creating new graph structures expressing e.g. information about further visual objects and generally about additions to and modifications in the general sensory context from previous steps going back to a previous step and repeating the steps in a system that flexibly adapts its processing resources and refines its relational memory for an improved representation of the sensed world as well as its knowledge about its own sensory processes.

The perceivable world can be sensed by acoustic sensors, tactile sensors and/or information received through software- or hardware interfaces.

The method may also adapt storage parameters, system parameters, event parameters, graph parameters and/or sensor parameters.

A memory of sensory events can be represented.

A memory of current visual sensory context may be represented by connected graphs of sensory events.

The computing resources can be a processing means which may be adapted for parallel processing.

The system can flexibly adapt its processing resources and/or refine its relational memory from previous steps for an improved representation of the sensed world.

The optimization may occur by taking into consideration task requirements in addition to the visual subtask information. Task requirements can be at least one of time vs. accuracy arbitration, resource conflicts, different measurements requiring the same sensory device, ordering and functional dependencies, which visual subtasks have to precede others, which use information from others, and subtask information compiled from experience during previous operations.

The experience of previous operations may be at least one of expected accuracy, information gain and processing cost/time spent for getting the results The optimization can occur by using task-specific gain and/or cost requirements.

The optimization may occur by using uncertainty information related to the expected and current information flow and/or by using probabilistic methods.

The visual subtask information used can be incrementally adjusted by collecting run-time statistics from the subtask operation.

The run-time statistics may be a time spent value and/or an accuracy of the results.

The run-time statistics can be used in the optimization steps.

The dependencies between visual events may be stored in the subgraphs in the following way: dependency information is explicitly stored as links between nodes representing sensory events, the dependency information is used together with the current state of the already compiled sensory information, the dependency links can be of different type, leading to a different evaluation of the processing order and the information flow, and each node representing a sensory event keeps track of the validity of its results, wherein this validity can be determined.

Links between nodes can express that the results of a first node depend on the results of a second node, so that the second node has to be processed before the first node.

The dependency information may serve to determine a processing order of visual subtasks.

The types of dependency links can be "mandatory", "optional" and/or "one-of-many".

For a first type of dependency links a strict order may be imposed between the two connected nodes, so that the processing of one node requires valid results of a dependent node.

For a second type of dependency links a processing node can use the results of a dependent node without processing it.

For a third type of dependency links the dependency may be resolved as soon as one of several dependent nodes has a valid result.

The validity of the results can be determined by a confidence of the measurement, the quality of the gained data or the time passed since its last measurement.

The processing order of visual subtasks may be dynamically determined.

The processing order of visual subtasks can be determined during visual analysis.

In the second dependency link type the processing node can use the results of a dependent node, if the dependent node has access to valid information, but ignore it otherwise.

The dependencies of the visual subtasks, which are resolved automatically, may comprise the steps of: getting the dependency links of a node representing the results of preceding visual events, for each predecessor node the dependency links connect to checking if the predecessor's data is valid and if this is the case continue with the next dependency, resolving the predecessor's dependencies in the same way as for its successor node, getting the data of the predecessor nodes, executing the nodes own sensory processes, eventually using the data from the predecessors, evaluating the validity of the results of the execution, marking the dependency as resolved and return to the successor node, and if the results of the node are invalid, deciding on a higher level when to call the visual subtask again.

Invalid results of the node can indicate that its predecessors already contained invalid data or that its quality/data confidence is below a certain criterion The resolving of the dependencies may be performed asynchronously.

The call of local processes, the call of visual subtasks and/or the resolving of the dependencies can be performed in parallel.

In another aspect, the invention provides a computer program product, executing a method as disclosed above when run on a computing unit.

In yet another aspect, the invention provides a computer vision system connected with a movable platform, such as a robot or a car, that uses the presented visual computation on demand for a data driven and resource-optimized visual operation, concentrating selectively on visual aspects that are relevant for a certain task.

In yet another aspect, the invention provides a vehicle or robot, provided with the disclosed vision system.

DETAIL OF THE INVENTION

Figure 1:
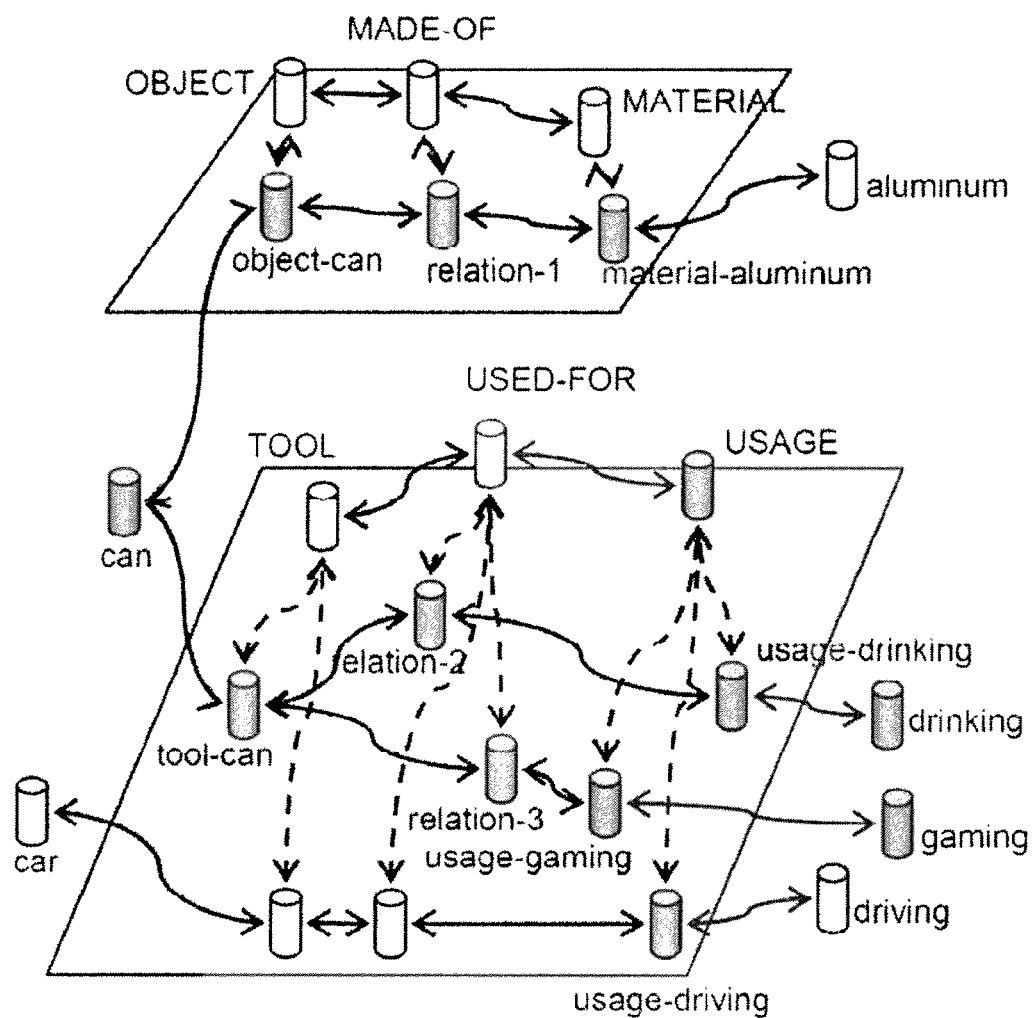
FIG. 1 illustrates an employed relational memory, which can represent an arbitrary number of link patterns. Some examples are shown here.

Cognitive vision systems, both technical and biological, with at least a minimal aim at generality have to carefully select the information they acquire from their environment.

This is necessary to fulfill constraints on computing and memory resources. Therefore, those systems implement algorithms to focus on certain aspects of the surrounding scene, depending on their need, their task and their knowledge about the world they have accumulated. This flexible control architecture as proposed in [1] must be able to dynamically rearrange the processing pathways of the system, use the already acquired knowledge and estimate the cost and benefits of the system's actions. To achieve this in a reasonable manner the system not only needs knowledge about relations between objects, but also needs knowledge about the relations of internal routines it can use to acquire information about its vicinity. This knowledge could then be used to determine which actions the system has to perform to measure a certain property of an object.

If, for example, the system wants to measure which color an object is, it first needs to know where the object is and what retinal size it approximately has.

Determining the position of an object might involve further processing which is again a dependency of the localization module and so on. The structure we have chosen allows modelling those dependencies along with the world knowledge the system has in a relational memory. In this paper, we concentrate on how we can efficiently represent the knowledge about dependencies between different routines and on how to use it in a system context.

In computer science, problems similar to the representation of dependencies exist. Those problems on representing a data flow of a computer program date back to the work of Dennis [2], [3]. In this and later work, graph structures are used to analyze the data and control flow of a computer program to parallelize and optimize the program by a compiler [4], [5]. There, the program dependence graph introduces a partial ordering on the statements and predicates in the program that must be followed to preserve the semantics of the original program [4, p. 322]. In the domain of computer vision, data flow graphs are also used to ease the design of vision systems and keep their complexity manageable [6].

However, all the mentioned methods map a fixed and predefined algorithm to a graph structure. This structure is used for parallelizing and optimizing that fixed algorithm later.

Contrary to that, we propose a method to implement an on-demand vision system that parses its internal representation of the dependencies and dynamically creates a program for acquiring the requested property of an object.

As the vast majority of the literature in the field of computer science shows, graph structures are well-suited for that purpose. In this paper we will show that:

Using graph structures we are able to consistently model functional dependencies between object properties along with the property structure of objects and world knowledge, both short- and long-term.

Using graph structures, the system is provided with the means to estimate the costs of a certain measurement. The graph size for measuring a certain property can be used as a cost function.

Using our proposed parsing algorithm, knowledge already acquired by the system can be reused in a simple and efficient way. This leads to a reduction of the computational demand and speeds up operations of the system.

Using our proposed parsing algorithm, the complexity of designing the vision system is considerably reduced by only modeling direct dependencies.

Below a memory structure of the system is presented together with the way the functional dependencies are modeled. Also modifiers required for covering the whole functionality of the vision system in the dependency structure are elucidated.

Further below, we propose a parsing algorithm that exploits the previously described graph structure. Special situations encountered while working with that structures are discussed.

Using the parsing algorithm presented, some experiments in a proof-of-concept system based on the architecture proposed in [1] are shown and the results are discussed.

Relational Memory
Memory Structure

Figure 2:
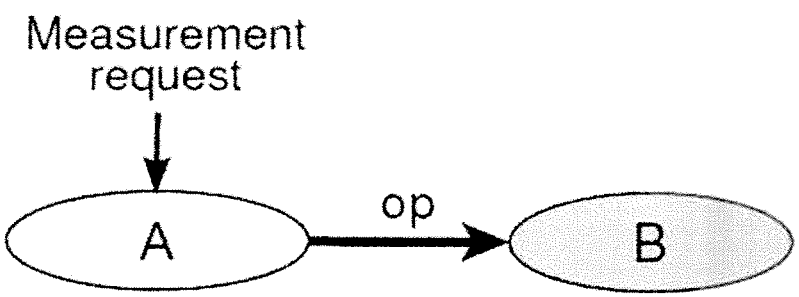
FIG. 2 shows that the measurement of node A depends on the operation op of node B. The pattern is stored in a memory as shown in FIG. 1.

In the inventive vision system the relational semantic memory proposed in [7] is used for representing information in the short- and long-term memory. This relational memory is, contrary to many other semantic memories, able to represent an arbitrary number of link patterns. Thus classical link types like "hasProperty", "isPartOf" or "isContainedIn" as shown in FIG. 1 can be defined. Additionally, a sensory representation is stored in the property nodes to be able to later feed back that information into the system. Along with the sensory representation a direct link to the visual routine used for acquiring a certain property is stored in the property nodes. Thus an attached visual routine can be instructed (demanded) to deliver information. The objects in the memory are composed of several visual properties. Beside the classical link patterns, dependency patterns can be constructed. The dependency pattern that can be seen in FIG. 2 reads as "the measurement of A depends on operation op of B". Given this link, we can measure A in a demand-driven way: if the system needs to measure node A, it knows it has to perform op of node B before being able to process A.

The operation op of B has no further dependency and can thus be performed directly. Afterwards A can be measured. If the structures are getting more complex and the graph is getting deeper, a more sophisticated algorithm is needed to parse the graph. Details can be found below.

Link Modifiers

Even though Ballance et. al state in their paper that neither switches nor control dependence are required for a demand driven interpretation [8, p. 261], we need some modifiers for the dependency link patterns to cover interesting cases of a vision system. Those interesting cases are:

The operation of node B is optional and not absolutely required for measuring node A, but would e.g. improve the result of the measurement. For example a spatial modulation map could constrain the search space for an object, but is not necessary, as in the latter case the whole space has to be searched for the object (see FIG. 3 a).

Figure 3:
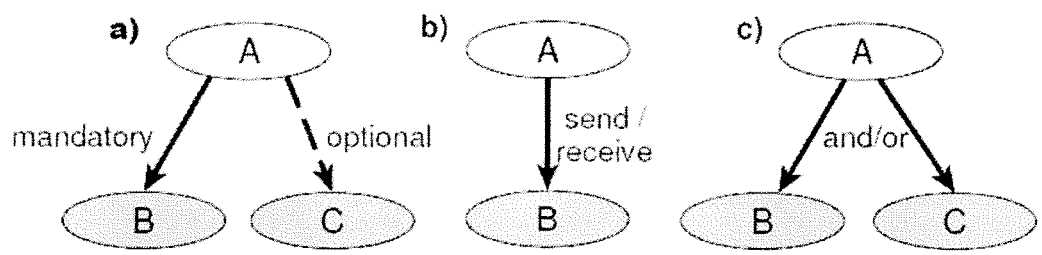
FIG. 3 shows how different cases are covered using modifiers for a dependency link pattern: a) dependencies can be optional or mandatory, b) different operations (send and receive) are requested for the target node and c) it can be differentiated between the need for all dependencies or only one-of-many dependencies to be fulfilled.

The system requires different operations for the target node to be executed before it is able to process the current node (see FIG. 3 b).

There might be alternative ways to measure a certain property and the system only needs to fulfill one of several dependencies. Think of different segmentation algorithms for estimating the shape of an object, where only one of those algorithms is required to get a shape (see FIG. 3 c).

The generic pattern we implement reads as "A depends dependency type on operation of B logical mode depends dependency type on operation of C . . . " In our case, the modifiers of this generic pattern are:

Dependency type: The link between the node can be mandatory or optional as shown in FIG. 3 a.

Operations: We realize send and receive operations that push or pull information of the target node, respectively as shown in FIG. 3 b.

Logical mode: The node "A can depend on B AND C" or node "A can depend on B OR C". That way we can mark alternative pathways by using the logical OR mode, else node A depends on all target nodes (see FIG. 3 c).

Node States

Here each node has a state marking the validity of the node data. This is used to determine if the node information needs to be updated, i.e. if the visual routine bound to this node needs to be executed or not. Basically there are two states, as the data is either valid or invalid. In the beginning, all nodes contain invalid data. After updating, i.e. receiving information from a visual routine, the datum of the node is valid. The transition of the node's state back to invalid can be determined by time or any other criteria. Below it is shown how the state of the nodes are used to dynamically reduce the number of operations when a node with valid data is encountered.

System Memory Layout

After discussing the different link types, operations, modifiers and node states, we now present the actual prototypical memory patterns used in the system.

Figure 4:
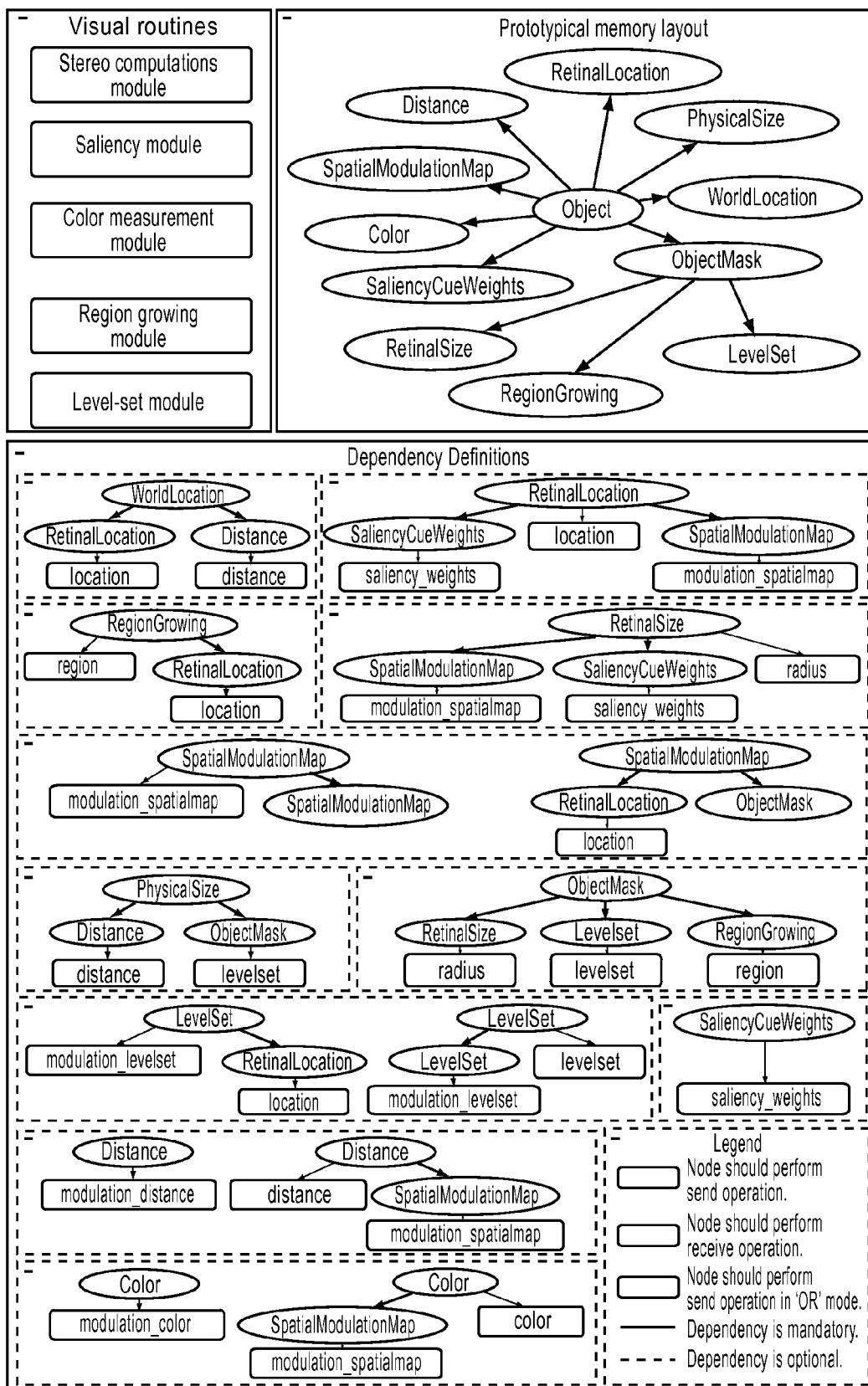
FIG. 4 shows an object structure (top) as used by our system. The binding (gray lines) to the visual routines (rectangles) is shown, both feed-forward and feed-back. At the bottom, a dependency structure can be seen. The rectangles mark the bindings (gray lines) to visual routine variables.

The upper part of FIG. 4 shows the view on the object structure. The object properties are bound to the different visual routines (shown in the upper left). In the lower part of FIG. 4, dependency patterns are shown. Please note that the illustration only shows two different views on the memory content. Both representations coexist in the very same memory using the same nodes. As you can see, we only define the direct dependencies of the node and not the whole tree. This eases the design process, as it keeps the system structure manageable. The complete dependency tree will later be generated on the fly using the parsing algorithm described below.

Dependency Parsing

Figure 5:
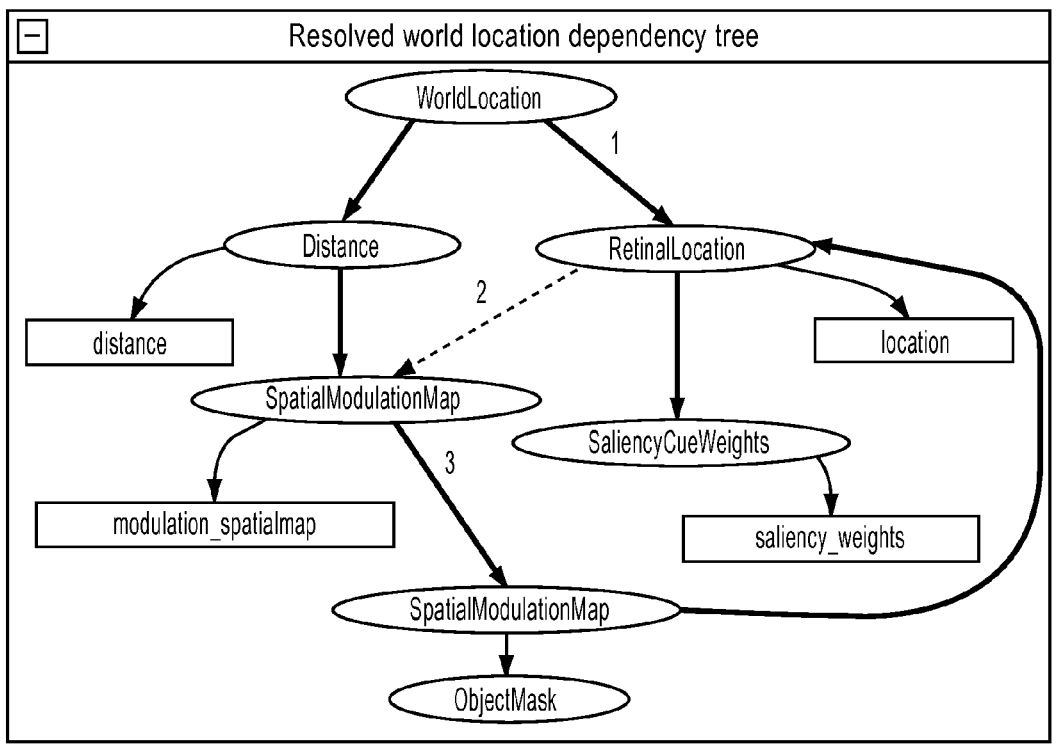
FIG. 5 shows a (for simplicity not fully) resolved dependency tree for a world location property of an object. The path described below is marked.

Above the way the system represents its knowledge about both, the world and its internal functional dependencies, is illustrated. Now it is shown how that knowledge is used for implementing a demand-driven acquisition of sensory information about the system's vicinity. At the bottom of FIG. 4, it is shown that only direct dependencies are defined. To update a property of an object like its 3D-position (world location), it is required to resolve the dependencies of that node. The resolved dependency graph for the world location in FIG. 5 illustrates the necessary steps.

Recursive Parsing

In the example of receiving the world location (see the steps in FIG. 5), this would require the measurement (receiving) of the retinal location (1) and the distance of the object, as the 3D-position of the object can be calculated by means of a depth estimation algorithm. However, the measurement of e.g. the retinal location itself depends on sending a spatial modulation map (2). The dependency is optional, as the retinal location can also be measured without having a modulatory input. The sending of the spatial modulation map itself depends on the acquisition (receiving) of the spatial modulation map (3). This makes sense, as the modulatory information needs to be obtained before it can be used.

Parsing the dependency graph can be formulated as a recursive problem. So the parsing algorithm is implemented as a recursive function, as can be seen in the pseudo-code below.

Figure 6:
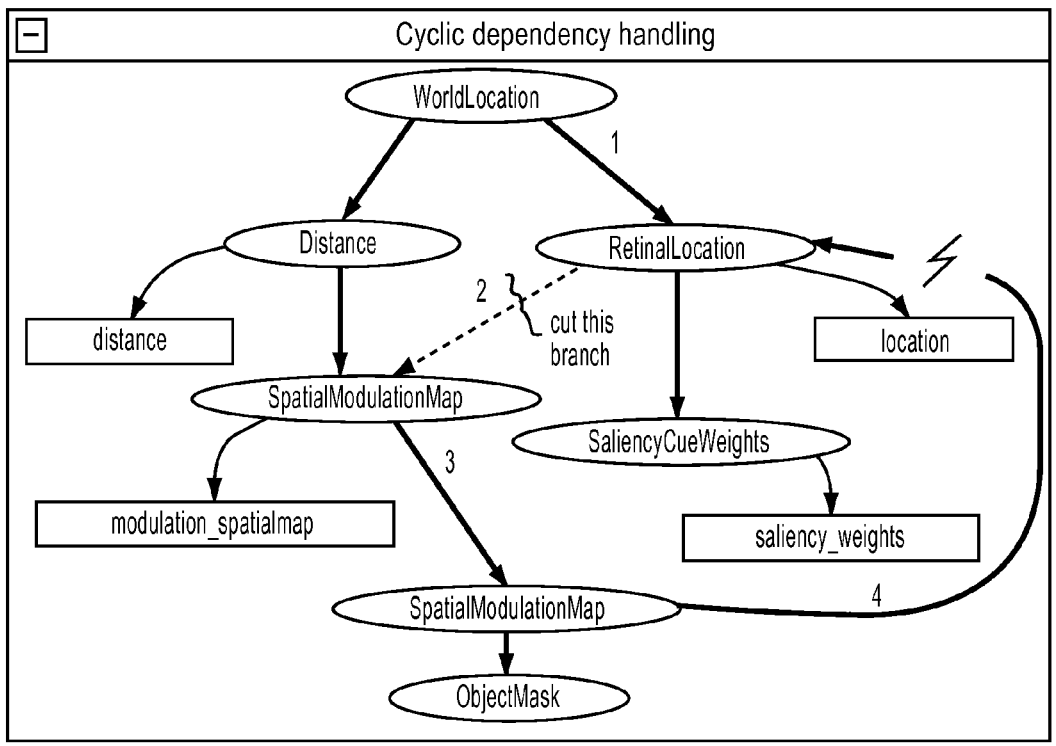
FIG. 6 illustrates a detection of a cyclic dependency at the retinal location node, which leads to a trace back of the path. A circular dependency can be resolved by cutting the branch between the retinal location and the spatial modulation map nodes.

The example is now continued and the dependencies are pursued one step further (see FIG. 6). The measurement of the spatial modulation map depends on the measurement of an object mask and on the measurement of the retinal location (4) of the object. These two information are necessary to create the spatial modulation map at the correct location with the correct shape. However, the retinal location node was already visited before. What is shown here is a loop or circular dependency, which would lead to a dead-lock situation if the system did not have means to deal with it.

So the first important point is to detect such circular dependencies which can be easily done by marking visited nodes in the graph and check if the node is already marked before entering it. The second important question is what to do once a circular dependency is detected. Here the dependency types described above come into play. After detecting a circular dependency, it is progressed back (4) to the parent node (spatial modulation map) and checked if the dependency is mandatory or optional. If the dependency is optional, we are done, as the loop at this point can be simply cut without breaking the algorithm. This is because the information that is missing is not essential for the algorithm to run. However, if the dependency is mandatory, the system cannot resolve the dependencies of the current node. The latter case is true for the example, because the spatial modulation map requires the retinal location to be known. Thus the system needs to go back another step (3) and check if the operation of the dependency graph's parent can be executed (in our case the sending of the spatial modulation map). As it can be seen in FIG. 6, this is not the case, as sending the spatial modulation map strictly depends on receiving it first. Again, the dependency path needs to be traced back one step (2). This brings us back to the receiving of the retinal location, which only optionally depends on sending the spatial modulation map. At this point we can "solve" the circular dependency by cutting the complete branch leading to the loop. The procedure for handling circular dependencies can be summarized as:

1) Detect a circular dependency.
2) If the current link leading to a dependency loop is optional, cut it and thus remove the whole branch containing the circular dependency.
3) Otherwise check if we are already at the root node. In this case, the dependencies cannot be resolved and an error should be returned. If we are not yet at the root node, trace back the dependency path one step and continue with step 2.

Reusing Already Acquired Knowledge

Figure 7:
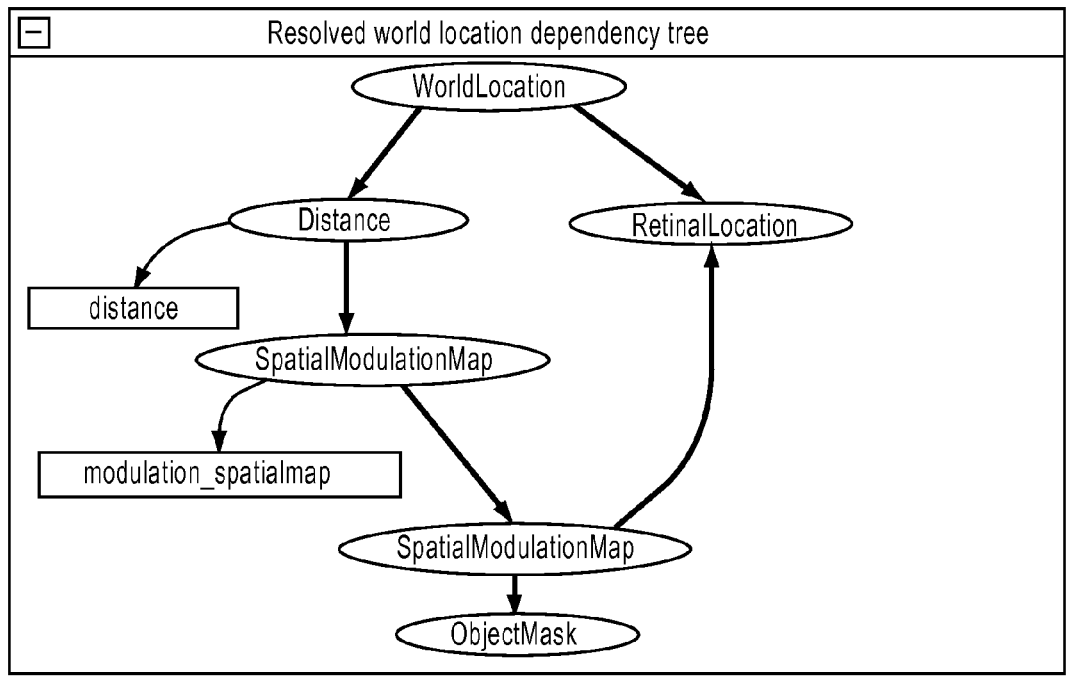
FIG. 7 shows how incorporating knowledge already acquired by the system changes the structure of the effective dependency graph and shrinks its size.

One of the biggest advantages of the approach to flexibly model functional dependencies is the fact that the knowledge the system has can be rerused. For doing so the node state was introduced above. This node state tells the graph parsing algorithm if a node requires updating, i.e. performing the operation required by its parents in the dependency graph, or if it already holds valid data. If the node already has valid data, the system does not need to execute the whole dependency sub-tree below the node. Assume that the retinal location (the data is still valid) was already measured and it is now desired to update the world location of that object. This will lead to the reduced graph you can see in FIG. 7. If that graph is compared to the original one in FIG. 5, it can be seen that the resulting graph is smaller. This means that the structure of the dependency graph is determined by the knowledge of the system. This is a main difference to previously proposed methods like [4], [8], [6], only working on fixed graphs.

Eventually, the graph shrinks by incorporating the knowledge of the system, leading to a more efficient and less demanding system.

Alternative Pathways

Figure 8:
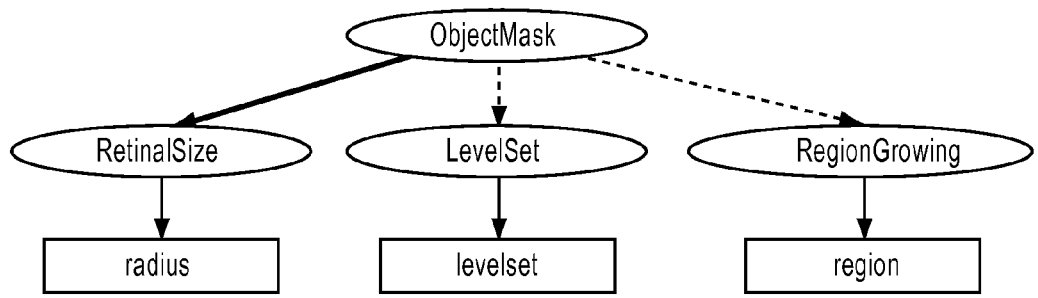
FIG. 8 shows a mask of an object, which can be calculated by an algorithms.

Alternative ways of measuring a certain object property are desirable in a cognitive vision system, as the redundancy often increases the robustness of the system. This is because different algorithms for determining a property might differ in the assumptions they make on the data, the way they compute the result, the speed, the accuracy and the weakness they might have. Therefore, also a way needs to be added to deal with such alternative pathways. In the example shown in FIG. 8 there are three different segmentation algorithms: a simple size estimation using the saliency map (see [9] for details), a region-growing method (see [10]) and a level-set method (see [11]). For modeling alternative pathways the logical OR mode was introduced above. As can be seen in FIG. 8, the "object mask" node is marked which indicates "OR nodes". The OR mode is interpreted by the graph parser as "only one of these dependencies is required". To calculate the object mask one of these routines needs to be started. However, if the different algorithms are looked at, it can be seen that they differ in speed, initial requirements and accuracy. The retinal size estimation is very fast and only needs the object's location as an initial value, but is not very accurate. The region-growing is fast (but slower than the retinal size estimation), only needs the object's location as an initial value and is more accurate at least for homogeneously structured objects. The level-set method on the other hand is relatively slow compared to the other two algorithms, needs an initial segmentation to start, but is very accurate even for structured objects. One consequence of the mentioned properties is that the level-set method can never be used for initially estimating the object mask, because it needs an initial mask to run. Furthermore, the system should be able to select the algorithm that is as accurate as required, but as fast as possible. What is therefore required is a decision dependent on the current system's state (e.g. required accuracy and available time) and the system's knowledge (e.g. initial object mask). In the easiest implementation the parser now tries to resolve the dependencies consecutively until one of them can be resolved (a node can deny its execution if its initial conditions are not fulfilled).

If none of the dependencies can be resolved, a trace back as described in the circular dependency case can be performed. Besides the resolvability of the dependencies, an extended version of the parsing algorithm could take into account the costs and accuracy of the different pathways.

The pseudo-code of the graph parsing algorithm has a recursive nature as the problem is recursive. The algorithm dynamically generates the dependency graph starting from the requested property. It also needs to take into account the cyclic dependency detection and handling. The update procedure reads as follows:

Procedure Update Node Value:
(a) Check the ability of the node to run
   (1) Check the current node for valid data. If it already has valid data, we skip any operation and return success.
   (2) Check for a cyclic dependency indicated by an already set visited flag. If we detect a cyclic dependency, hand the corresponding error to the node's parent.
   (3) Set the visited flag for the current node.
(b) Updating dependencies
   (1) Get the list with all dependencies for the current node.
   (2) For each dependency (child node) do:
      (2.1) Call Update Node Value on the child node.
      (2.2) check the return code of the call for a cyclic dependency error. If we get such an error and we have a mandatory dependency for that child node, propagate the error further up to our parent. For an error on an optional dependency we continue with processing the next dependency in the list.
      (2.3) If we are on a logical or node, we can leave the loop and continue with (c), because at least one dependency is fulfilled.
(c) Execute current node's operation
   (1) Perform the send or receive operation of the current node as requested by the parent and optionally store the sensor data locally.
   (2) Set the data validity flag.
   (3) Remove the visited flag.

Experiments

Figure 9:
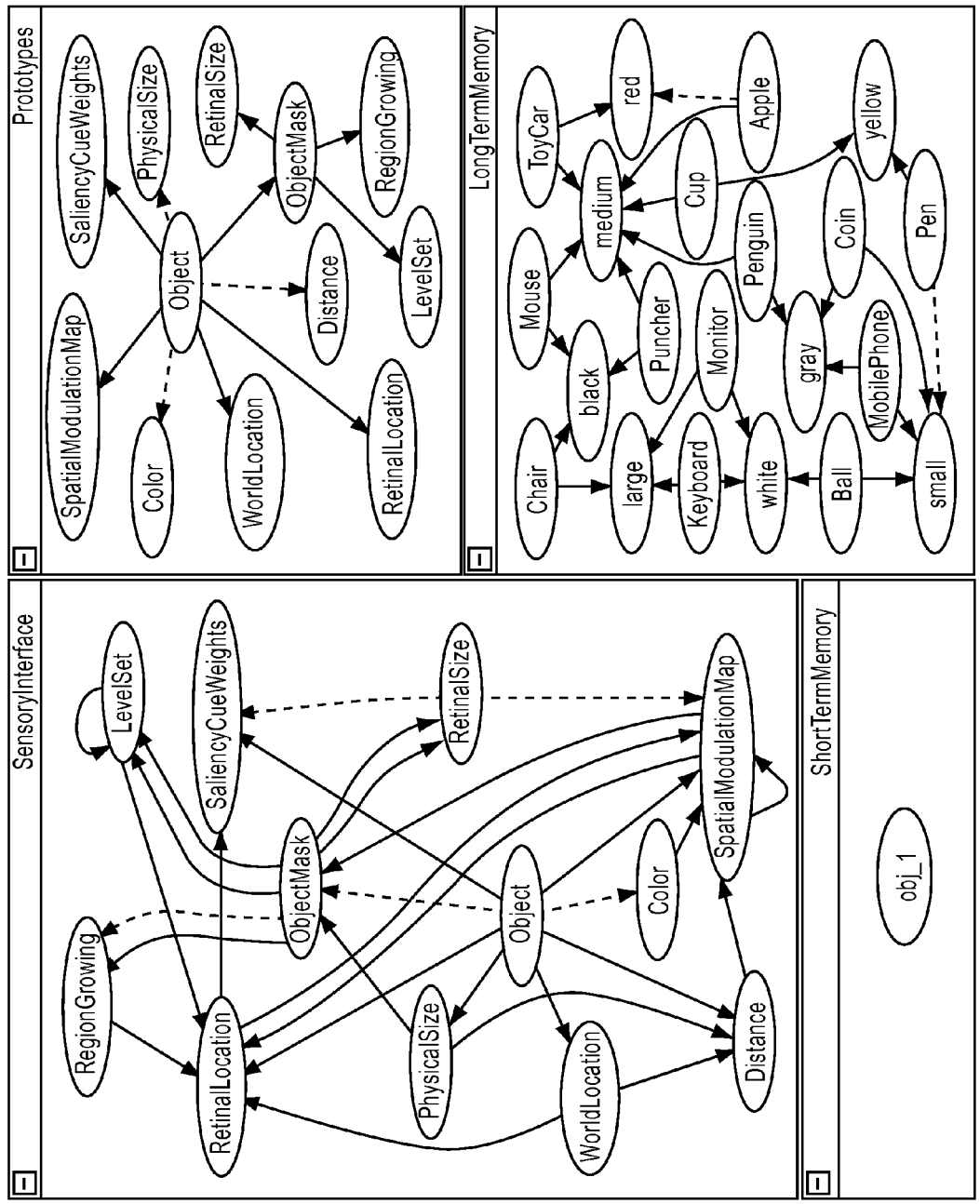
FIG. 9 on the left-hand side shows both the "hasProperty" and the "dependsOn" connectivity. On the right-hand side the pure structural definition (top) and the content of the long-term memory (bottom) is shown.

By using the algorithm above and the structural definitions shown in FIG. 4 *a* proof-of-concept system is implemented. The memory content of the system can be seen in FIG. 9. In the "prototypes" section of FIG. 9 only the structure of an object is defined i.e. it is defined which properties constitute an object and how they relate. In the proof-of-concept system we only use "hasProperty" links (black). In the "SensoryInterface" section the object structure is inherited and the dependency definitions and the bindings to the visual routines are added. The dependency structure originates from the direct dependency definition shown in FIG. 4.

The long-term memory inherits the object structure from the "SensoryInterface". Here only the "hasProperty" links are shown to maintain readability. As can be seen, not all properties are instantiated per object (here only color and size are chosen). However, other nodes like retinal location or distance can be instantiated on demand.

Property nodes in the long-term memory store sensory representations which are stable for the objects linked to them. Other more volatile object information is not stored there, but rather measured in a concrete scene and stored in the short-term memory. The content of the short-term memory inherits its structure from the long-term memory. To summarize, the object structure is propagated by inheritance through the different memory instances starting from the prototypical definitions down to the short-term memory.

Beside this structural information the representation is enriched by the bindings to the sensors and the graph linking nodes depending on each other. The binding and dependency graph is introduced in the "SensoryInterface" layer. Up to this point no real values are filled into the property nodes. This happens in the long-term memory for long-time stable sensor data that can be linked to one or more objects.

Based on this memory structure, it is now shown what an update process for a node looks like. The update process for the colour property of object 1 is illustrated in FIG. 10.

Please note that the dependency resolving process and the subsequent information propagation process are implemented asynchronously. The first step to update a property is to instantiate it (see FIG. 10 *a*). In doing so, the properties up to the prototypical definitions are inherited. One of those properties are the dependencies of the node. To measure the colour of an object a spatial modulation map is needed, which in turn requires the retinal location of an object, which again needs weight factors for the saliency. The result of that propagation process is shown in FIG. 10 *b*.

Because the weights for the saliency have no further dependency, they can be sent right away. After doing so, all dependencies of the retinal location node are fulfilled and it requests its visual routine for data (see FIG. 10 *c*). After triggering the visual routine of the retinal location node, the process continues at the spatial modulation map. As defined previously (see FIG. 4), the modulation map requires an object mask to be processed. The object mask is an OR node, because three alternative measurement processes exist (retinal size estimation, region growing and a level-set method). Only one of these visual routines needs to run.

Figure 10:
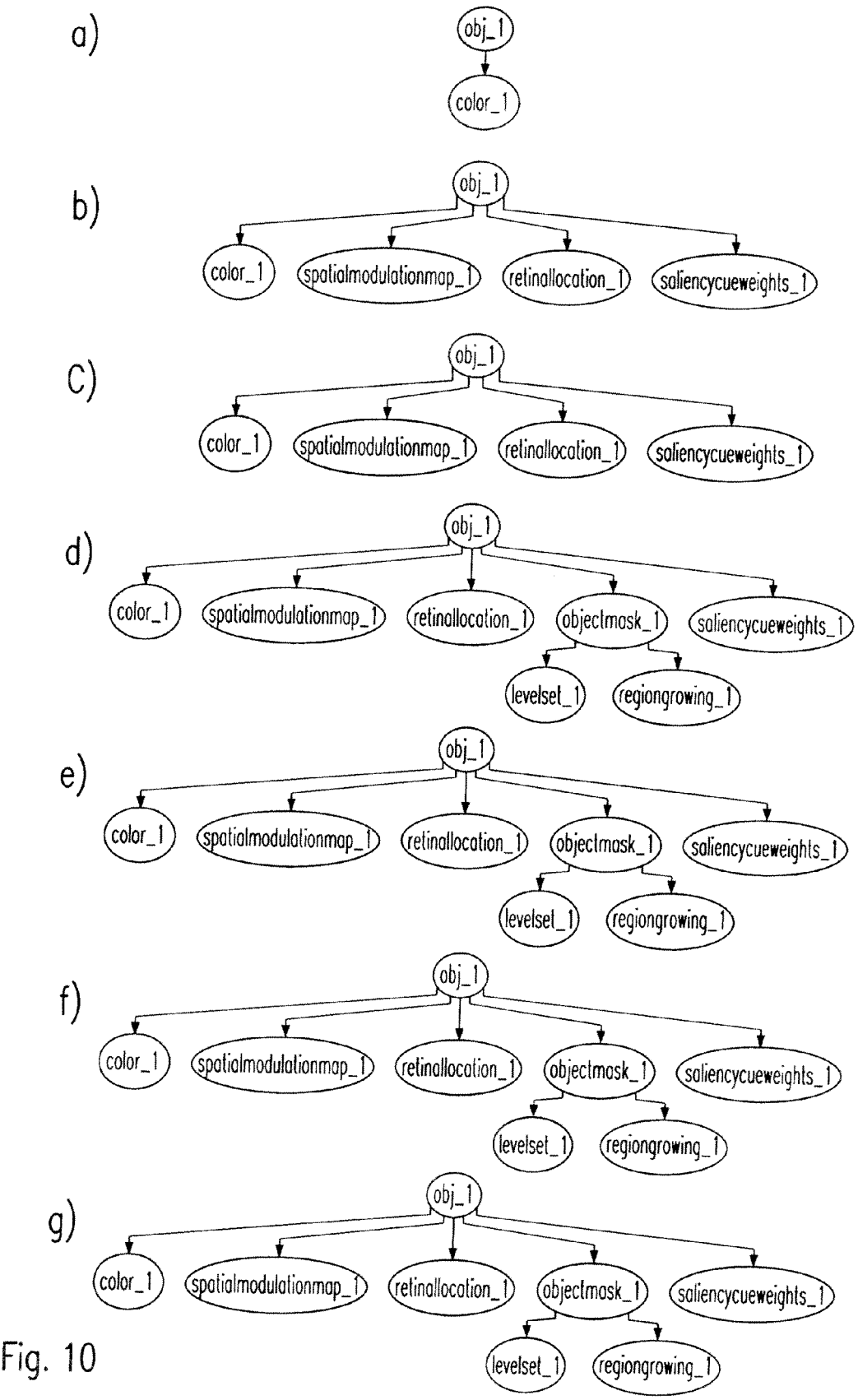
FIG. 10 shows an update process for the color property of object 1 zoomed into the short-term memory with nodes currently resolving dependencies, nodes waiting on data to receive, nodes waiting on data to send and nodes finished sending data.

As shown in FIG. 10 d, the object mask node first tried to trigger the level-set measurement. However, as described above, this algorithm needs an initial mask to run. An alternative to having such a mask, so is to use a region growing method. Because the region growing node is the last leaf node, the dependencies is resolved by tracing back the dependency path while executing the node operations. This can be seen in FIG. 10 e to g. Finally, all marked nodes triggered their visual routine to deliver data. The spatial modulation map waits on data to send them.

Figure 11:
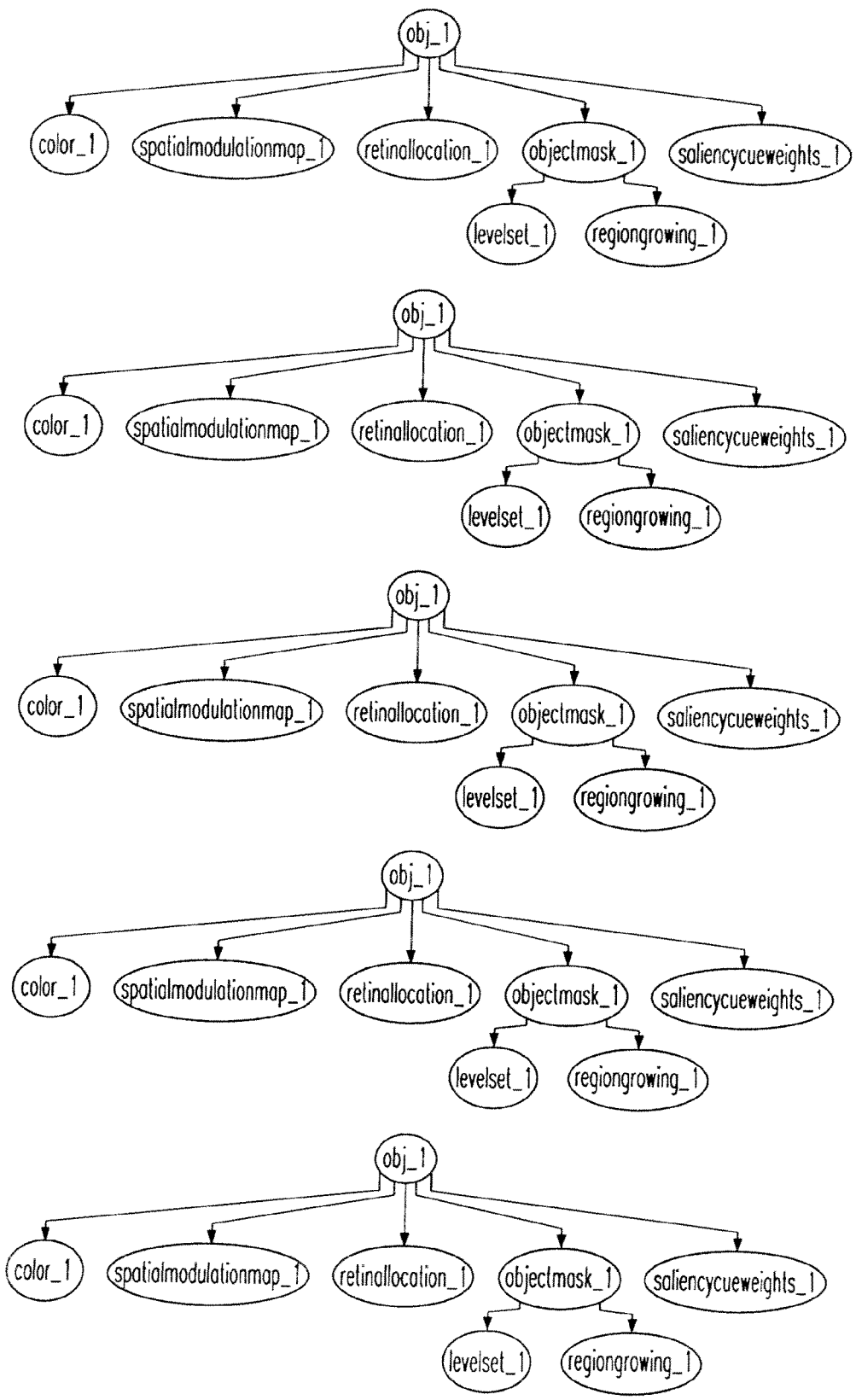
FIG. 11 shows how arriving information (retinal size and region growing mask) travels along the dependency tree and triggers computations in their parent nodes with nodes that have finished receiving.

When the data arrives from the visual routines, they get propagated upwards along the dependency tree. In FIG. 11 the retinal location and the mask of the region growing algorithm arrive (almost) simultaneously. The information about the region growing mask then travels upwards to the object mask where the processing can be finished. With a valid object mask and the retinal location of the object, a spatial modulation map can be computed and sent subsequently. After sending the spatial modulation map, the visual routine of the colour node runs and eventually returns the colour (see bottom of FIG. 11).

Assume that after some time, the data of some nodes gets invalid again. Such a case is shown in the top row of FIG. 12 where the data of the nodes retinal location, region growing and object mask got invalid. Furthermore, assume that the system needs to know the distance of object 1.

Figure 12:
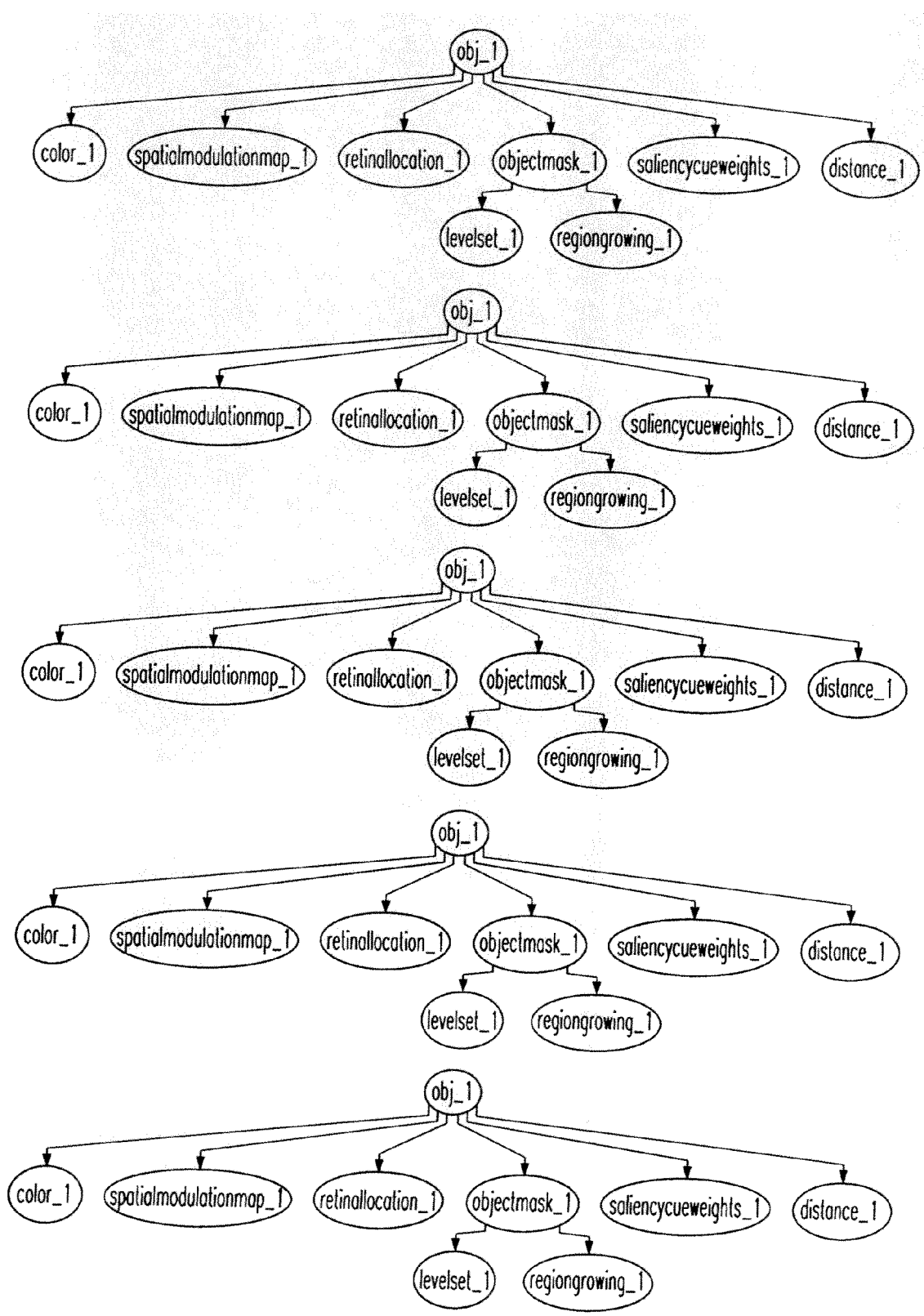
FIG. 12 illustrates how the system requests a distance of the object. During this process, the existing information about the spatial modulation map gets reused, which reduces the computational demand dramatically.

Receiving the distance requires sending the spatial modulation map (see FIG. 4). Typically, sending this map requires the retrieval of the map, but in this case, the data of the spatial modulation map is still valid. Thus there is no need for updating and the process can continue with just sending out the information. If this procedure is compared to the procedure in FIG. 10, where sending the spatial modulation map triggered the whole object mask and retinal location branch, the computational effort is reduced dramatically. Finally, the distance is requested and received by the system as shown at the bottom of FIG. 12.

Interim Result

The above presented system uses graph structures to represent both knowledge about functional dependencies and knowledge about the world in a consistent way. The fact that the relational semantic memory in our system can represent an arbitrary number of link patterns between nodes and is furthermore able to bind visual routines to its nodes. The modelling of dependency links are described and some modifiers for that link pattern are introduced, which allow to cover important use cases for vision systems. The cases of optional and mandatory information, different node operations modelling the direction of information flow and alternative pathways are discussed. A parsing algorithm based on the dependency link structure is layed out, which is able to detect and under certain circumstances "resolve" circular dependencies. Beyond this, the parsing algorithm is also able to efficiently reuse previously acquired sensory information and thus reduces the computational demand while keeping the full function of the system. The experiments show that with this framework allows to build systems that acquire data on demand and are able to flexibly adapt their processing chain.

It is also possible for the system to estimate the costs of a certain action. The number of dependency nodes can be used as a cost function. However, one could also think of measuring the time a certain action takes and use this as a cost function.

With this information, the system learns which actions it can take if a time constraint applies. In the same direction, the system can furthermore learn how accurate and reliable a certain pathway is and use fast but coarse functions in cases where precise information is not necessary. To push this a step further, the system may also try to find the dependencies itself and learn "optimal" processing queues.

Besides estimating the dependency structure we could easily exploit the consolidated findings from computer science like [4] and later work to optimize and parallelize processing pathways.

The algorithms found there can be easily applied, as the underlying structure is comparable.

Core of the Invention

The invention furthermore provides a computer vision system that is driven by internal tasks that involve the resolution of visual subtasks by an active, semi-sequential recruitment and modulation of visual routines that selectively analyze the visual input. This recruitment and modulation occurs dynamically, during runtime, and is based not only on long-term knowledge about visual items and processes, but also on the currently available short-term information about a visual scene, its items and their properties compiled during immediately preceding steps of visual analysis. The long-term and the short-term memory might be structured as described above.

Figure 13:
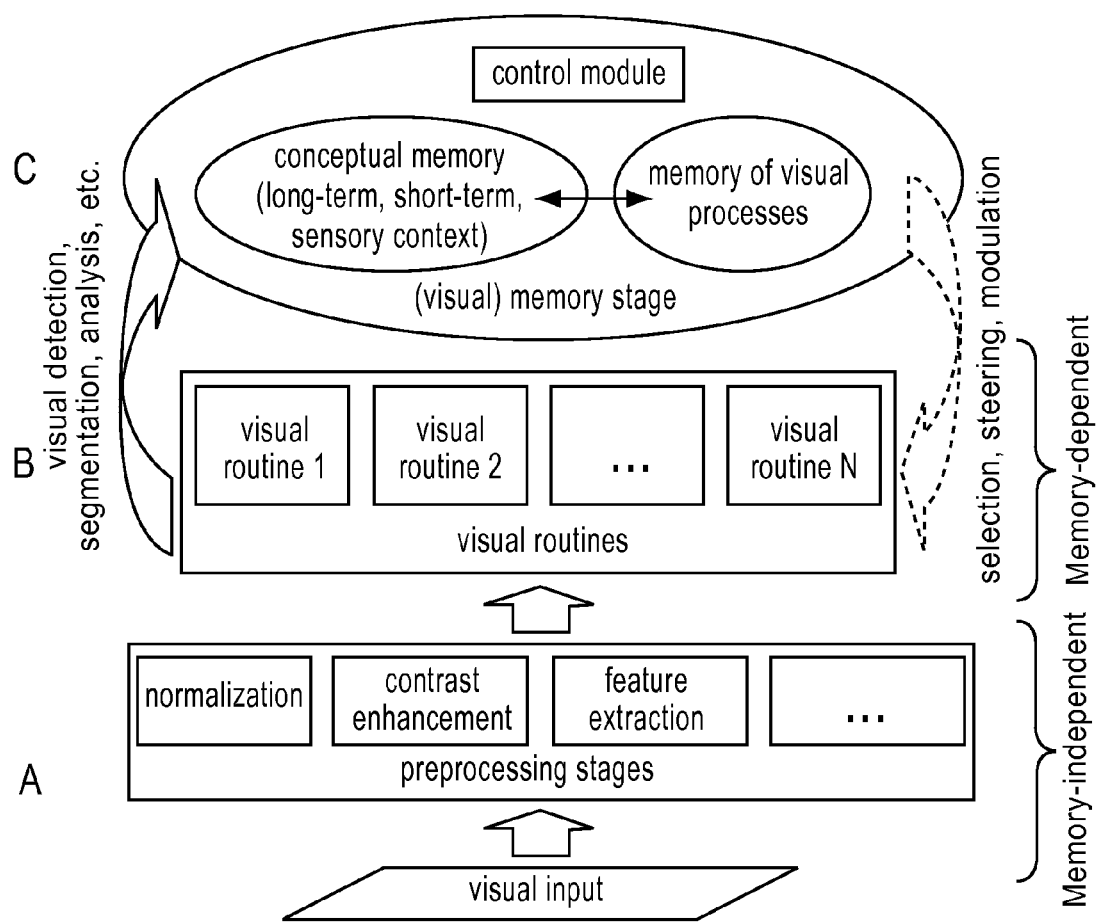
FIG. 13 shows the inventive system with its main components.

The system with its main components is shown in FIG. 13. At the bottom, visual input is acquired and analyzed/pre-processed by a series of non-task-specific pre-processing stages. The visual input may comprise more than a single image, as it is e.g. the case for stereo or multi-camera arrangements, and may also be grey-scale, color or using other visual domains, like infrared. The pre-processing stages (FIG. 13 A) may involve e.g. normalization, contrast enhancement, edge and feature extraction and similar processes, with the property that they do not require a knowledge about the scene and its objects, i.e., they are unspecific and general. The exact type of pre-processing operations is not relevant for this invention so that in the following we will not detail this further.

The output from the pre-processing stages is used by the "visual routines", shown in FIG. 13 B. These are visual processes that are object or context specific, i.e., they depend on what is searched for and/or what is already known about a visual scene, i.e., what is stored in short-term memory about the current sensory context. The object or context specificity is communicated via top-down connections arriving from a visual memory (dashed arrow on the top right in FIG. 13); and it involves selection, steering and modulation of the visual routines using parameters derived from specific object or context memory.

Examples for visual routines are the detection of object candidates by looking for specific features indicative of an object's presence, object-specific tracking, location-specific segmentation, etc.

An inherent property of visual routines is that they can be activated specifically for the fulfillment of their assigned basic visual subtask, so that in normal operation only a (nevertheless dynamically changing at runtime) subset of visual routines is activated at each time step.

The steerable visual routines are at the heart of knowledge-based selective visual analysis and together with visual memory and control processes they provide a way to intelligently manage the computational resources in a general-purpose vision system.

The visual routines are steered from and deliver their results to a memory stage shown in FIG. 13 C. Here, the sensory information from different visual routines is compiled and put in relation to already existing information about the visual scene. The memory stage comprises three main constituent parts:

1) the conceptual memory (both long- and short-term),
2) the memory of visual processes, and
3) a control module that arbitrates between the visual routines, the conceptual memory and the memory of visual processes.

The conceptual memory is used to represent characteristic patterns that appear in the sensory input and that can be related e.g. to visual templates, physical objects, visual surroundings (like rooms) or characteristic scenes (indoor, outdoor, . . . ). It is called conceptual because it stores information of what makes up a specific sensory concept.

The concepts stored in conceptual memory are valid for a certain lifetime, spanning a continuum ranging from concepts that are assumed to be generally valid ("long-term") and stable over time to concepts that represent a certain temporary measurement or hypothesis about sensory objects, and that is expected to change on a short timescale ("short-term").

Long-term conceptual memory would e.g. contain the information of what defines a car visually, i.e., that it has wheels as components which should be arranged in a special spatial configuration. To the contrary, short-term memory would e.g. represent the information of particular cars at a particular time steps, that have been detected from sensory input and that move in sensory space as well as in 3D world coordinates. In this case, the short-term memory of a sensory element "car" is a specialization of a long-term concept "car", in the sense that it inherits many of its properties but has additional information related to the sensory characteristics of an actually measured car as well as information related to the current measurement processes (coupled to visual routines) engaged in gaining and updating the object-related sensory information.

The memory of visual processes is used to represent information of how to measure certain sensory, and in particular visual, properties of items from the conceptual memory.

Coming back to the car example, it would define how to find out if there are wheels in a proper arrangement that together confirm the presence of a sensory pattern that allows the system to infer that there is a car in the scene.

At a lower sensory level, it provides a link from the memory to the visual routines, explicitly containing all relevant information that is needed to access the visual routines and to retrieve their results. In a way, the memory of visual processes comprises a representation of a systems own sensory apparatus and the possible actions that can be taken on it at the level of visual routines.

Figure 14:
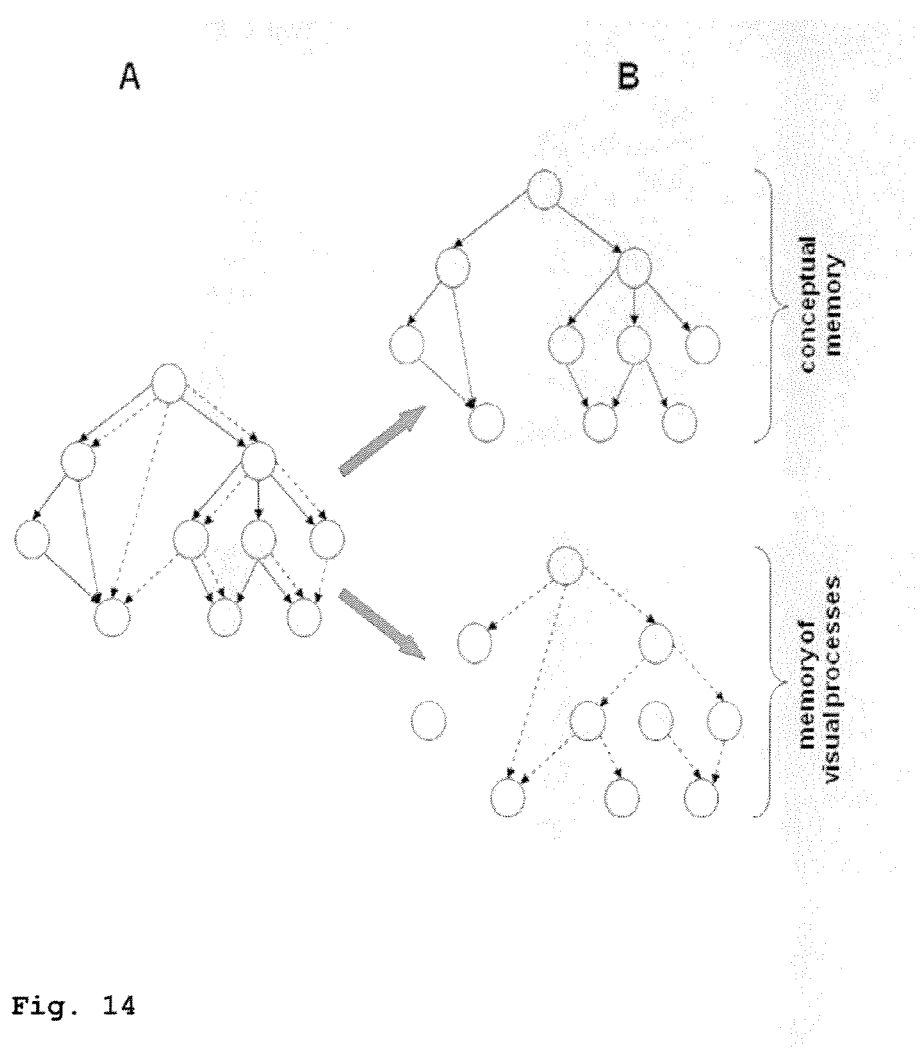
FIG. 14 illustrates a conceptual and process memory.

Both the conceptual memory as well as the memory of visual processes is represented in form of hierarchical graphs, as previously described, containing nodes that operate as conceptual hubs and directed links of several different types that indicate relationships between nodes, see FIG. 14 A.

In the case of the conceptual memory, links e.g. denote that the presence of certain visual properties or subparts (the wheels of the car) is a good indication for a more global pattern concept (the car).

In the case of the memory of visual processes, a different type of links attached to the global concept (car) indicates that before the system can infer that a car is present, wheels have to be detected and this e.g. occurs by recruiting a visual routine for car part detection. It has to be noted that both types of memory are interwoven within a single graphical structure using the same nodes but different links, i.e., they can be visualized as two non-disjunct subnets that communicate via the nodes as shown in FIG. 14 B.

The nodes additionally contain internal parameters associated with current sensory measurements (e.g. the position, colour, etc. of an object) together with confidences as well as parameters needed for driving visual processes and the visual routines.

Figure 15:
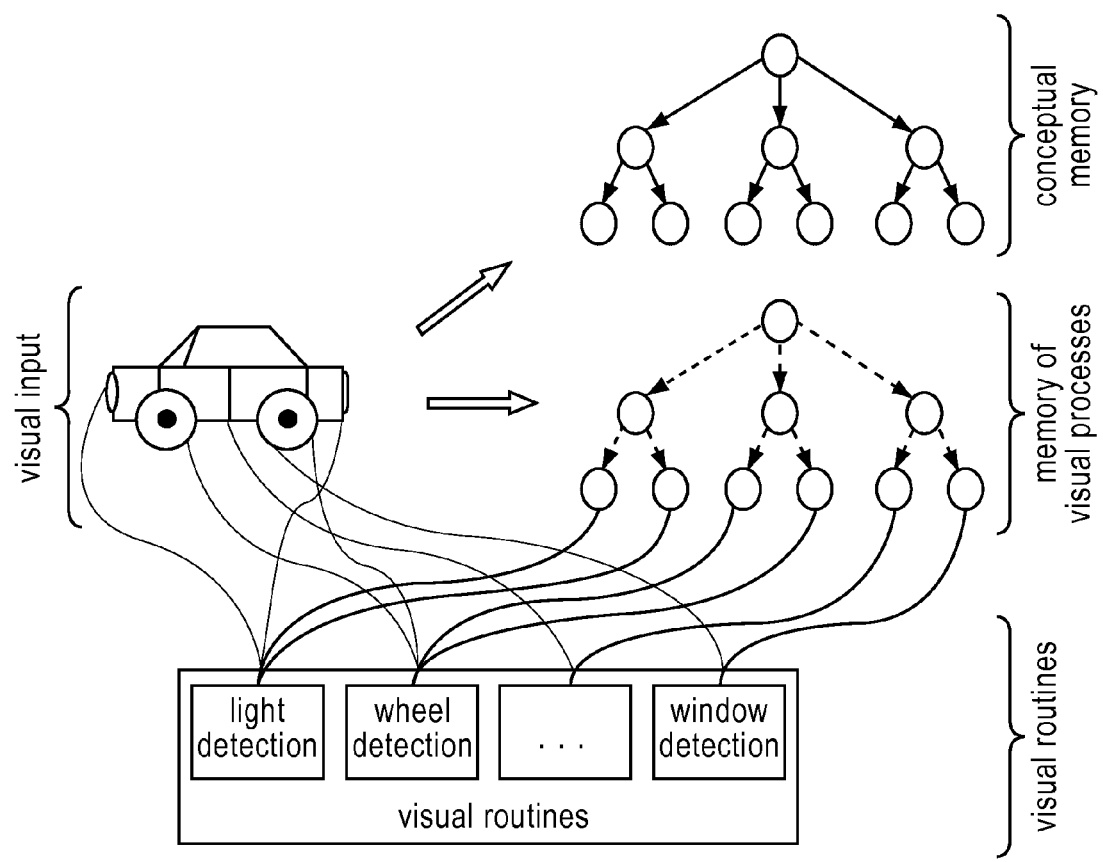
FIG. 15 shows a more detailed sketch of a visual input along with internal visual memories, stored in subnets for the conceptual memory and the memory of visual processes.

FIG. 15 shows a more detailed sketch of a visual input along with the internal visual memories, stored in subnets for the conceptual memory and the memory of visual processes.

The conceptual memory contains the concept of the car in a hierarchical graph, e.g. by specifying which parts like lights, wheels, windows, visual appearance, etc. a car should have. The memory of visual processes encodes how to measure e.g. the presence of these parts by accessing the corresponding visual routines, like specialized wheel detecting modules.

In addition, the conceptualized car may contain information such as e.g. the expected relative position where certain car parts are expected to be found, or which features would make it easy to detect them (such as a red colour for the rear light). This information is then selectively passed down towards the visual routines, which can make use of it to constrain and improve their function. For example, if the front wheel of the car has already been detected and therefore the rear wheel is expected to be found in a certain area, the visual routine in charge of detecting it can be constrained to search only in this area, making the search cheaper and the results more robust.

Both the long- and the short-term memory of the system are updated dynamically during runtime. The updating includes parameter values stored in the nodes of the graphs as well as the creation, modification and destruction of graph structures. New graph structures appear e.g. when new sensory items are included into the short-term memory (for example if visual routines indicate an item pop-out because it is very salient, like a moving object against a stationary background), or when already detected sensory items are combined to form larger conceptual compounds (for example when two wheels have been detected and are then bound to a new conceptual node representing the sensory detection of a car).

Graph structures can be destroyed when their sensory validity is no longer given, e.g. when an item vanishes from the scene and is not expected to reappear.

The control module controls the information flow between the conceptual memory, the memory of visual processes and the visual routines. It continuously identifies sets of nodes with parameters that should be updated or measured.

By the memory of visual processes, the control module can link the parameters to the processes necessary to measure them. Therefore, the goal to measure a parameter is equivalent to a visual task, like finding out whether a certain object is actually present in a scene or what is its location, colour, etc. In short, the control module makes use of the process memory in combination with the currently available conceptual memory to decide how to measure the required parameters.

The selective access of visual routines, depending on the already gathered conceptual information contained in long-term, and, more importantly, in short-term sensory memory, allows making an efficient use of processing resources. Processing resources (computational cost, energy consumption, operating time, memory resources) are a main issue for complex visual scenes, since for them, the space of features that can be potentially explored increases exponentially. It is therefore impossible to foresee all necessary feature analysis stages in a purely signal-driven manner. A memory-based selective scheme alleviates the resource problem and postulates vision as a hypothesis-driven, guided search process. Hierarchical representations as provided by the graph-based memory structure can reduce the processing resources even further, resulting in a coarse-to-fine search. In addition, a restriction to only those visual routines and parameter regimes that are necessary for a given task increases the robustness and reliability of measurement results.

The control module uses different hints to select, steer and modulate the visual routines that are necessary for a visual task. It uses information stored in the links related to the memory of visual processes to check for the expected information gain and costs when performing particular sensory events and for dependencies between the sensory events (see FIG. 14 B bottom, dashed arrows) and their link to visual routines (see FIG. 15 bottom).

In a specific embodiment of the invention, dependency links are used with different qualifiers/link types, leading to a different effect of the processing order and the information flow. Used types were. "mandatory", "optional" and "one-of-many".

In a first case, a strict order is imposed between the two connected nodes, so that the processing of one node first requires valid results of a dependent node, rendering it necessary that the dependent node is processed first.

In a second case, a processing node can make use of the results of a dependent node, if the dependent node has access to valid information, but ignore it otherwise.

In a third case the dependency is resolved as soon as one of several dependent nodes has achieved a valid result.

The dependency information is used together with the current state of the already compiled sensory information to determine the processing order of visual subtasks. In addition, information about expected gain and costs are taken into consideration, so that the control module can decide e.g. if it wants to get approximate results with low or accurate results with higher processing costs. If uncertainty information is available (attached to the process memory and the sensory measurements), probabilistic methods that work on graphical structures can be included here. Each node representing a sensory event keeps track of the validity of its results. This validity can be determined e.g. by a confidence of the measurement, the quality of the gained data or the time passed since its last measurement.

Figure 16:
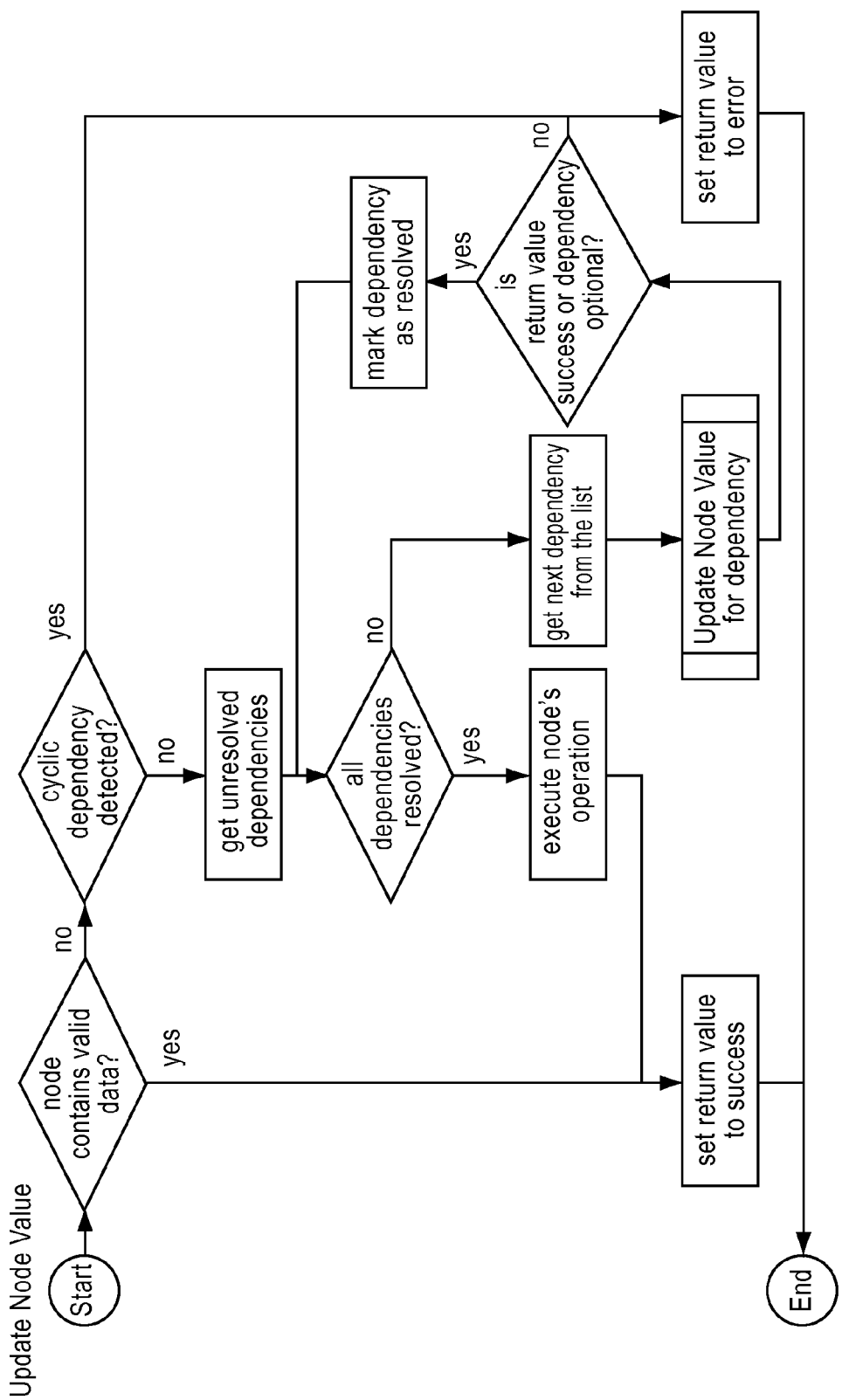
FIG. 16 shows a program flow diagram.

The control module allows dependencies of the visual subtasks to be resolved automatically. This is shown as a program flow diagram in FIG. 16 and comprises the steps of iteratively traversing the graph depending on the information from the memory of visual processes, the expected gain and cost as well as the validity of the results. The conceptual memory, especially the short-term sensory memory, is used to store what has already been inspected and to serve as parameters for the context—(i.e., conceptual memory)—dependent visual routines. The iterative graph traversal at some point arrives at nodes that are linked to visual routines (as shown in FIG. 15 bottom right), triggering a specific visual analysis. When a visual routine delivers a result, its validity is checked by the attached memory node and communicated further to the predecessor node that called it. In this way, the necessary sensory processes are triggered and the dependencies of a visual task are solved.

The invention can also be summarized as
I. a method for computer vision that adapts its information processing flow, its processing resources and its parameters using explicit knowledge about the perceivable world, its objects and its properties, the current vision task, the sensory context, and the perception apparatus itself, comprising the steps of:
   a. representing the memory of sensory events such as visually perceivable objects as node entities with measurable sensory parameters that are connected to other nodes by directed links expressing functional relationships,
   b. representing the memory of current visual sensory context by connected graphs of sensory events,
   c. representing the memory of visual subtask information, i.e., information on how to access and measure sensory parameters of Ia in special subgraphs and local processes attached to these subgraph nodes and links,
   d. dynamically allocating processing resources during runtime and organizing information flow by using the information from the memory introduced in steps Ia-Ic,
   e. optimizing the resource allocation and the information flow depending on the graph structures from Ia-Ic.
   f. storing estimated values gained from sensory measurements in the corresponding node and link entities of the graph, in this way updating the information from Ia and Ib,
   g. incrementally adapting and creating new graph structures expressing e.g. information about further visual objects and generally about additions to and modifications in the general sensory context from Ia, Ib
   h. going back to Id and repeating the steps Id-Ih in a system that flexibly adapts its processing resources and refines its memory from steps Ia-Ic for an improved representation of the sensed world as well as its knowledge about its own sensory processes.
II. The method described in item I, wherein the optimization of point Ie occurs by taking into consideration task-specific gain and cost requirements in addition to the visual subtask information from Ic, such as: time vs. accuracy arbitration, resource conflicts (different measurements requiring the same sensory device), ordering and functional dependencies (which visual subtasks have to precede others, which use information from others), as well as subtask information compiled from experience during previous operations (such as the expected accuracy, information gain and processing cost/time spent for getting the results).
III. The method described in item I or II, wherein the optimization occurs by taking into account uncertainty information related to the expected and current information flow, and by using state-of-the-art probabilistic methods.
IV. The method described in any one of items I-III, wherein the visual subtask information used in step Ie is incrementally adjusted by collecting run-time statistics from the subtask operation, especially, the time spent and the accuracy of the results, so that this information can be used in the optimization steps Ie, II and III.
V. The method described in any one of items I-IV, wherein the dependencies between visual events are stored in the subgraphs of Ic in the following way:
   a. Dependency information is explicitly stored as links between nodes representing sensory events (expressing e.g. that the results of a node A depend on the results of a node B, so that node B has to be processed before node A).
   b. The dependency information is used together with the current state of the already compiled sensory information to dynamically determine the processing order of visual subtasks during visual analysis.
   c. The dependency links can be of different type, leading to a different evaluation of the processing order and the information flow. Used types are e.g. "mandatory", "optional" and "one-of-many". In the first case, a strict order is imposed between the two connected nodes, so that the processing of one node requires valid results of a dependent node. In the second case, a processing node can make use of the results of a dependent node, if the dependent node has access to valid information, but ignore it otherwise. In the last case the dependency is resolved as soon as one of several dependent nodes achieved a valid result.

d. Each node representing a sensory event keeps track of the validity of its results. This validity can be determined e.g. by a confidence of the measurement, the quality of the gained data or the time passed since its last measurement.

VI. The method described in any one of items I-V, wherein the dependencies of the visual subtasks are resolved automatically. This comprises the steps of:

a. Getting the dependency links of a node representing the results of preceding visual events.

b. For each predecessor node that the dependency links connect to:
i. Check if the predecessor's data is valid according to IVd. If this is the case continue with the next dependency of Vb.
ii. Resolve the predecessor's dependencies in the same way as for its successor node, starting at Va.

c. Get the data of the predecessor nodes.

d. Execute the nodes own sensory processes, eventually using the data from the predecessors.

e. Evaluate the validity of the results of the execution.

f. Mark the dependency as resolved and return to the successor node.

g. If the results of the node are invalid (indicating either that its predecessors already contained invalid data or that its quality resp. data confidence is below a certain criterion), decide on a higher level when to call the visual subtask again.

VII. The method described in any one of items I-VI, wherein the resolving of the dependencies is done asynchronously.

VIII. The method described in any one of items I-VII, wherein the call of local processes, the call of visual subtasks and the resolving of the dependencies is done in parallel.

IX. The method described in any one of items I-VIII connected with a movable platform, such as a robot or a car, that uses the presented visual computation on demand for a data driven and resource-optimized visual operation, concentrating selectively on visual aspects that are relevant for a certain task.

It should be understood that the foregoing relates only to embodiments of the invention and that numerous changes and modifications made therein may be made without departing from the scope of the invention as set forth in the following claims.

REFERENCES

[1] Julian Eggert, Sven Rebhan, and Edgar Korner. First steps towards an intentional vision system. In Proceedings of the 5th International Conference on Computer Vision Systems (ICVS), 2007.

[2] Jack B. Dennis. First version of a data flow procedure language. In Proceedings of the Colloque sur la Programmation, volume 19 of Lecture Notes in Computer Science, pages 362-376, London, UK, 1974. Springer-Verlag.

[3] Jack B. Dennis. Data flow supercomputers. Computer, 13(11):48-56, November 1980.

[4] Jeanne Ferrante, Karl J. Ottenstein, and Joe D. Warren. The program dependence graph and its use in optimization. ACM Transactions on Programming Language and Systems, 9(3):319-349, July 1987.

[5] Robert Cartwright and Matthias Felleisen. The semantics of program dependence. In Proceedings of the ACM SIGPLAN 89 Conference on Programming Language Design and Implementation, pages 13-27, 1989.

[6] Per Andersson. Modelling and implementation of a vision system for embedded systems, 2003.

[7] Florian Rohrbein, Julian Eggert, and Edgar Koerner. Prototypical relations for cortex-inspired semantic representations. In Proceedings of the 8th International Conference on Cognitive Modeling (ICCM), pages 307-312. Psychology Press, Taylor & Francis Group, 2007.

[8] Robert A. Ballance, Arthur B. Maccabe, and Karl J. Ottenstein. The program dependence web: A representation supporting control-, data-, and demand-driven interpretation of imperative languages. In Proceedings of the ACM SIGPLAN 90 Conference on Programming Language Design and Implementation, volume 25, pages 257-271, New York, N.Y., USA, 1990. ACM.

[9] Sven Rebhan, Florian Rohrbein, Julian Eggert, and Edgar Koerner. Attention modulation using short- and long-term knowledge. In A. Gasteratos, M. Vincze, and J. K. Tsotsos, editors, Proceeding of the 6th International Conference on Computer Vision Systems (ICVS), LNCS 5008, pages 151-160. Springer Verlag, 2008.

[10] Milan Sonka, Vaclav Hlavac, and Roger Boyle. Image Processing, Analysis, and Machine Vision. Thomson-Engineering, 2 edition, 1998.

[11] Daniel Weiler and Julian Eggert. Multi-dimensional histogram-based image segmentation. In Proceedings of the 14th International Conference on Neural Information Processing (ICONIP), pages 963-972, 2007.

[12] Clouard R., Elmoataz A., Porquet C. & Revenu M.: Borg: A Knowledge-Based System for Automatic Generation of Image Processing Programs. IEEE Transactions on Pattern Analysis and Machine Intelligence. 1999. Vol. 21 (2).

[13] Shekhar C., Moisan S., Vincent R., Burlina P. & Chellappa R.: Knowledge-based control of vision systems. Image and Vision Computing. 1999. Vol. 17.

[14] Sridharan M., Wyatt J. & Dearden R.: HiPPo: Hierarchical POMDPs for Planning Information Processing and Sensing Actions on a Robot. In Proceedings of the International Conference on Automated Planning and Scheduling. 2008.

[15] Sridharan M., Dearden R. & Wyatt J.: E-HiPPo: Extensions to Hierarchical POMDP-based Visual Planning on a Robot. In the 27th PlanSIG Workshop. 2008.

The invention claimed is:

1. A method for adapting and optimizing information processing of a computer vision system using accumulated knowledge about a perceivable world as sensed by vision sensors, its objects and its properties, a current vision task, a sensory context, and a perception apparatus, said method comprising the steps of:

storing for each object a number of object properties and routines, wherein visual routines are bound to object properties, the object properties representing nodes, establishing link connections between nodes expressing dependencies between the nodes, storing for each node a node information, said node information comprising estimated values gained from sensory measurements of the object properties corresponding to each node;

storing for each node a node state, indicating whether information stored for the node requires an update, generating a subtask structure for each node as a subgraph, comprising the node and its direct dependent nodes and routines, the nodes and routines in the subgraph are required to be accessed or executed to update information stored for the node, in case an update of a node information is required at an initial node, at run-time the method dynamically determines the nodes required to update the node information by recursively traversing link connections for nodes of the subgraphs for each node starting with the initial node, during traversal, builds a graph structure from the subgraphs of traversed nodes in case the information stored for a traversed node also requires an update, in case the information stored for the traversed node does not require an update, only the traversed node is included into the graph, detects circular dependencies in the built graph and resolves circular dependencies in the built graph structure, by removing links of a specific type, generating an information flow from the built graph with resolved dependencies comprising the nodes which need to be accessed to node information, or the routines bound to the nodes which need to be executed to determine updated node information, the information flow represents the steps that need to be performed to update the node information at the initial node, wherein the dependencies in the graph establish an execution order of the nodes and routines, executes the task represented by the built graph to obtain the updated node information for the initial node.

2. The method according to claim 1, wherein the perceivable world is sensed by acoustic sensors, tactile sensors or information received through software- or hardware interfaces.

3. The method according to claim 1, wherein the method adapts storage parameters, system parameters, event parameters, graph parameters and/or sensor parameters.

4. The method according to claim 1, wherein a memory of sensory events is represented.

5. The method according to claim 1, wherein a memory of current visual sensory context is represented by connected graphs of sensory events.

6. The method according to claim 1, wherein task requirements in addition to the visual subtask information are used.

7. The method according to claim 1, wherein task-specific gain or cost requirements are used.

8. The method according to claim 1, wherein uncertainty information related to expected and current information flow or probabilistic methods are used.

9. The method according to claim 1, wherein dependencies between visual events are stored in the subgraphs in the following way:

a. dependency information is explicitly stored as links between nodes representing sensory events, b. the dependency information is used together with the current state of the already compiled sensory information, c. the dependency links can be of different type, leading to a different evaluation of the processing order and the information flow, and d. each node representing a sensory event keeps track of the validity of its results, wherein this validity can be determined.

10. The method according claim 9, wherein links between nodes express that the results of a first node depend on the results of a second node, so that the second node has to be processed before the first node.

11. The method according claim 9, wherein the dependency information is to determine a processing order of visual subtasks.

12. The method according to claim 9, wherein the types of dependency links are "mandatory", "optional" or "one-of-many".

13. The method according to claim 9, wherein for a first type of dependency links a strict order is imposed between the two connected nodes, so that the processing of one node requires valid results of a dependent node.

14. The method according to claim 13, wherein for a second type of dependency links a processing node uses the results of a dependent node without processing it.

15. The method according to claim 13, wherein for a third type of dependency links a dependency, is resolved as soon as one of several dependent nodes has a valid result.

16. The method according to claim 9, wherein the validity of the results is determined by a confidence of a measurement, the quality of the gained data or the time passed since its last measurement.

17. The method according to claim 1, wherein the dependencies of the visual subtasks are resolved automatically comprising the steps of:

a. getting the dependency links of a node representing the results of preceding visual events, b. for each predecessor node the dependency links connect to:

i. checking if the predecessor's data is valid and if this is the case continue with the next dependency, ii, resolving the predecessor's dependencies in the same way as for its successor node, c. getting the data of the predecessor nodes, d. executing the nodes own sensory processes, eventually using the data from the predecessors, e. evaluating the validity of the results of the execution, f. marking the dependency as resolved and return to the successor node, and g. if the results of the node are invalid, deciding on a higher level when to call the visual subtask again.

18. The method according to claim 17, wherein invalid results of the node indicate that its predecessors already contained invalid data or that its quality/data confidence is below a certain criterion.

19. The method according to claim 1, wherein the resolving of the dependencies is performed asynchronously.

20. The method according to claim 1, wherein the call of local processes, the call of visual subtasks or the resolving of the dependencies is performed in parallel.

21. A computer program product, comprising program code embodied on a non-transitory computer-readable medium, said program code, when run on a processor, controls the processor to execute a method according to claim 1.

22. A computer vision system using the method according to claim 1, connected with a movable platform, such as a robot or a car, which uses the presented visual computation on demand for a data driven and resource-optimized visual operation, concentrating selectively on visual aspects that are relevant for a certain task.

23. A vehicle or robot, comprising a vision system according to claim 22.

* * * * *